Figure 1:
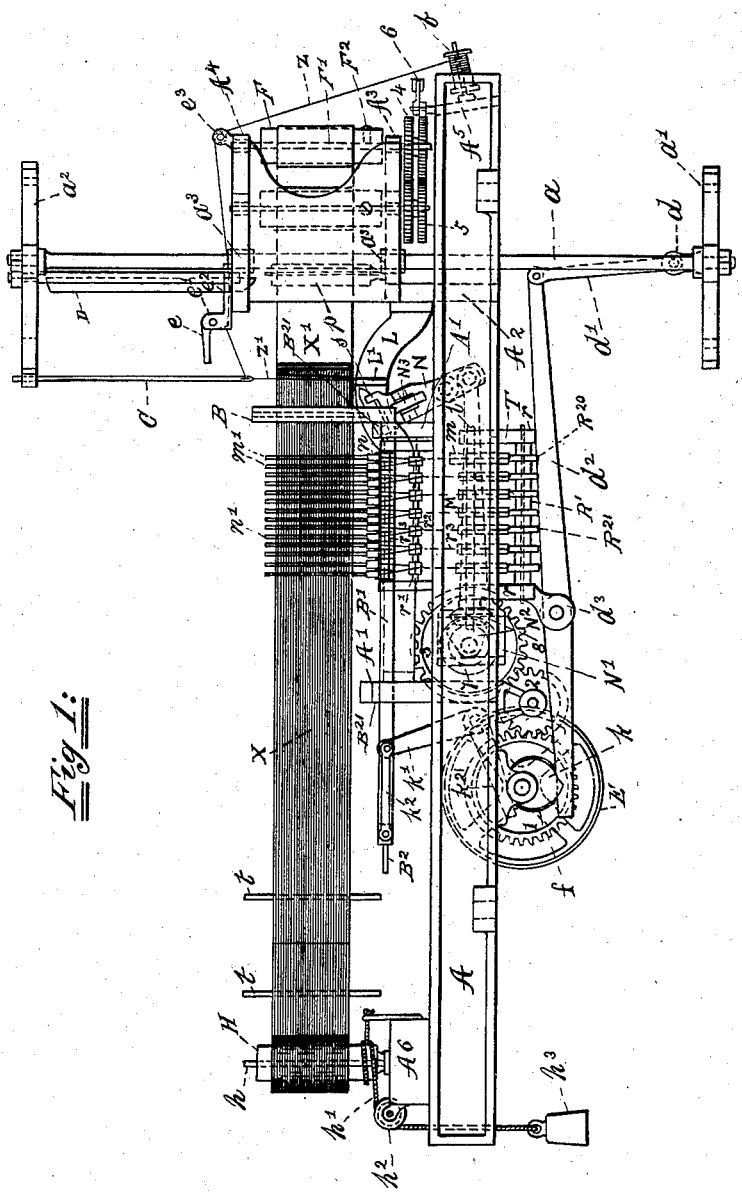

No. 705,649. Patented July 29, 1902.
D. F. CONKLIN & T. G. SINGER.
LOOM.
(Application filed Mar. 1, 1901.)
(No Model.) 5 Sheets—Sheet 1.

WITNESSES:
Stella A. Hughes.

INVENTORS
Drake F. Conklin and
Theophil G. Singer
BY
John F. Kerr
ATTORNEY

No. 705,649. Patented July 29, 1902.
D. F. CONKLIN & T. G. SINGER.
LOOM.
(Application filed Mar. 1, 1901.)
(No Model.) 5 Sheets—Sheet 2.
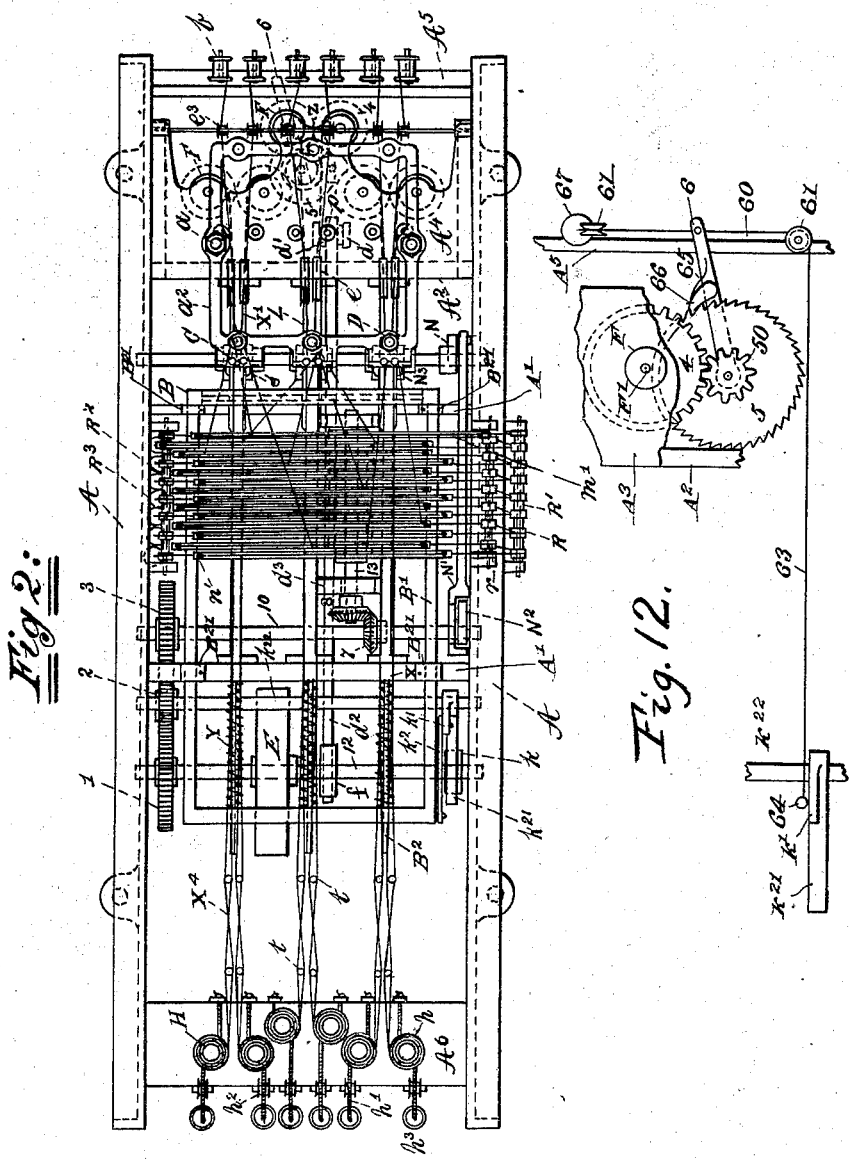
WITNESSES: INVENTORS
Stella A. Hughes. Drake F. Conklin and
C. W. Baldwin Theophil G. Singer
BY
John F. Kerr
ATTORNEY No. 705,649. Patented July 29, 1902.
D. F. CONKLIN & T. G. SINGER.
LOOM.
(Application filed Mar. 1, 1901.)
(No Model.) 5 Sheets—Sheet 3.
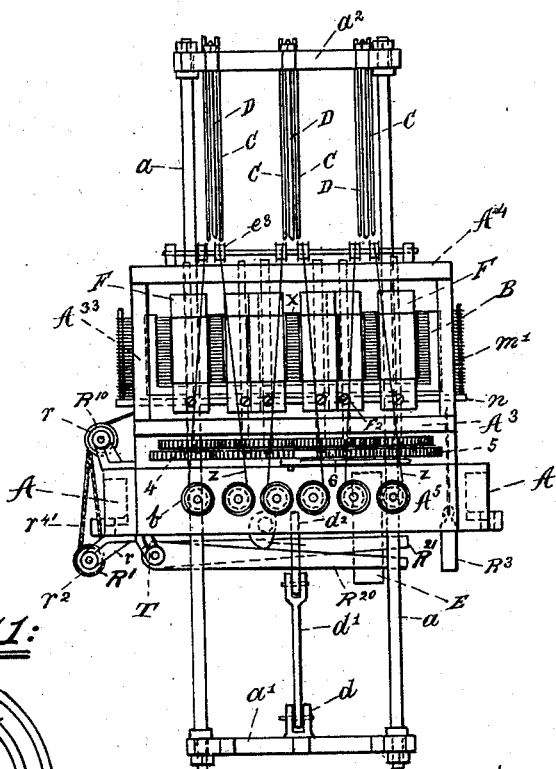
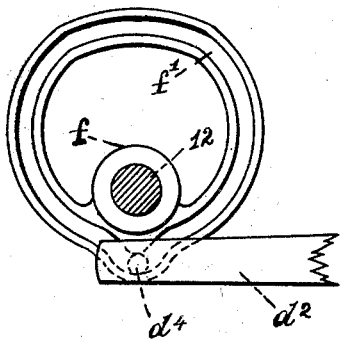
WITNESSES:
Stella A. Hughes.
INVENTORS
Drake F. Conklin and
Theophil G. Singer
BY John F. Kerr
ATTORNEY

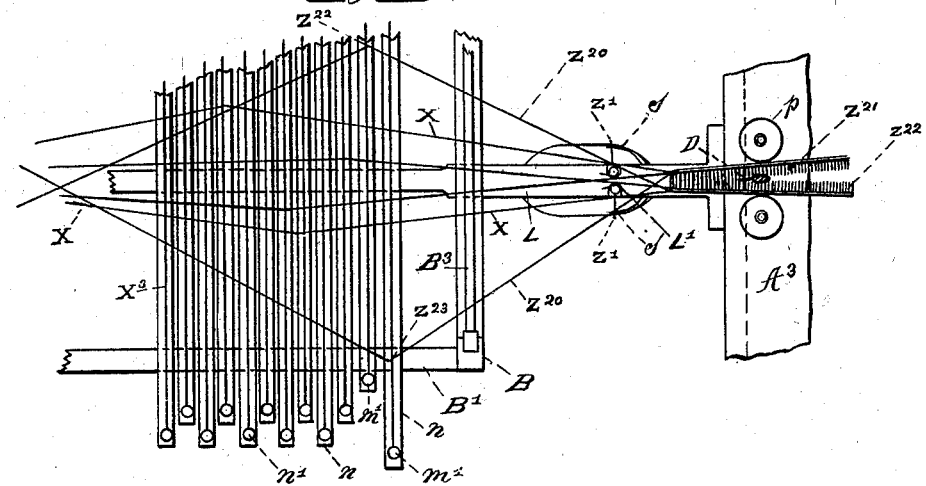
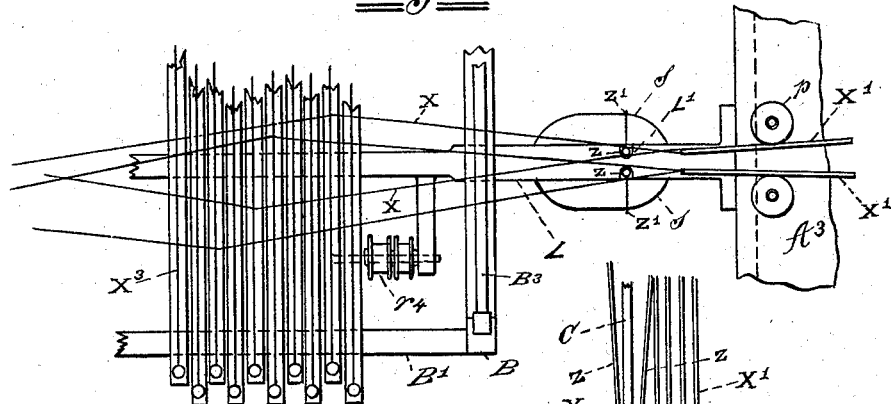
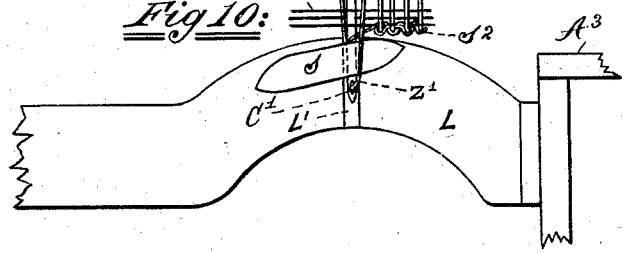

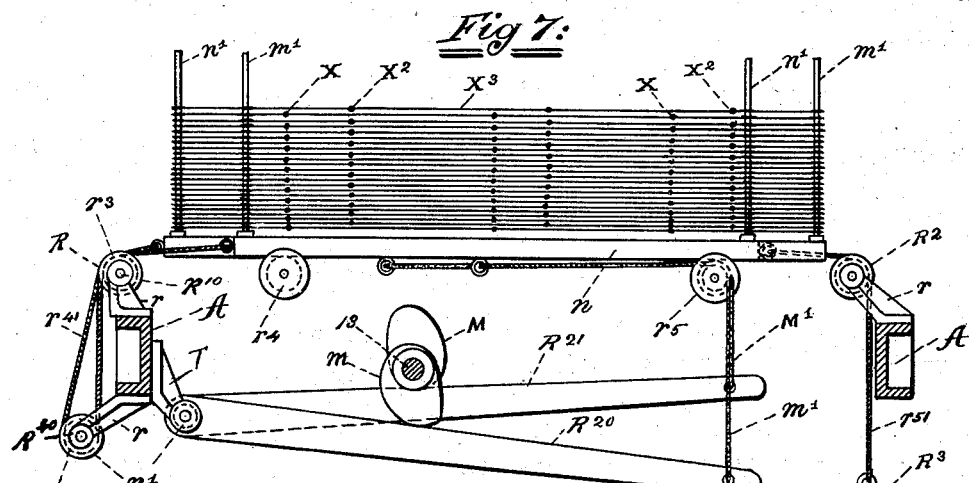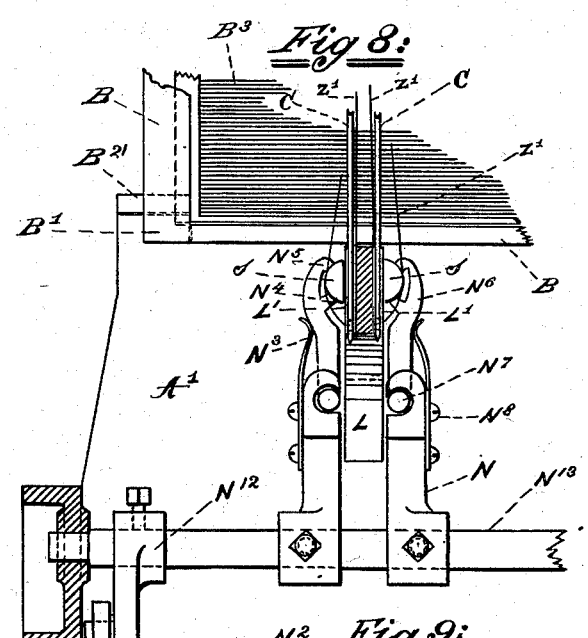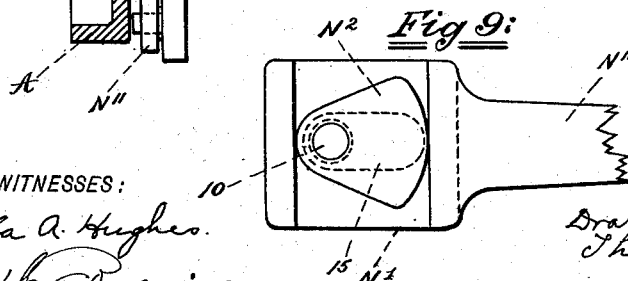

UNITED STATES PATENT OFFICE.

DRAKE F. CONKLIN AND THEOPHIL G. SINGER, OF HOBOKEN, NEW JERSEY.

LOOM.

SPECIFICATION forming part of Letters Patent No. 705,649, dated July 29, 1902.

Application filed March 1, 1901. Serial No. 49,450. (No model.)

*To all whom it may concern:*

Be it known that we, DRAKE F. CONKLIN and THEOPHIL G. SINGER, citizens of the United States of America, residing at the city of Hoboken, in the county of Hudson and State of New Jersey, have invented certain new and useful Improvements in Looms, of which the following is a specification, reference being had therein to the accompanying drawings.

The object of our invention is to produce a simple method of and loom for weaving plain velvet, ribbons, tapes, or other goods, the minimizing of the friction of the moving parts, the reduction of the weight of the machinery, the economizing in space, (inasmuch as six ribbons can be woven by our loom in the space now necessary for weaving two,) and rapidity of production.

Our invention is a radical departure from the present methods of weaving. The warps are placed and the goods are woven in a vertical position instead of in a horizontal position on the loom.

Our invention consists of a loom novel in the construction and arrangement of its parts and in the combinations thereof.

The different sets of warps in our loom are arranged in vertical planes parallel with and adjacent to each other. The heddles are operated laterally from the main shaft of the loom. The weft is carried through the warp-shed from above by a vertically-operating needle driven from the main loom-shaft, and the lower selvage is bound by the passage of a selvage-thread shuttle through the weft-loop formed by the vertically-operating weft-needle, which shuttle-operating mechanism is also driven from the main loom-shaft. The reed located transversely across the loom is operated from the main loom-shaft and drives up the filling or weft to the fell.

Our loom may be converted from a ribbon-loom into a plush or velvet loom simply by the addition of a vertically-operating knife and two extra shafts or heddles, so that instead of two ribbons being woven vertically parallel to each other and in close propinquity, but separate and distinct, we would have a loom weaving a double cloth which would be separated by the vertically-operating blade, according as it was woven.

In the accompanying drawings, in which similar characters of reference indicate like parts, Figure 1 is a side elevation of our loom. Fig. 2 is a plan view thereof. Fig. 3 is a front elevation. Fig. 4 is a detail view of cams for operating the weft-carrier or needle and the reed. Fig. 5 is a detail view of the arrangement of our loom for the conversion thereof into a velvet-loom. Fig. 6 is a detail view of the arrangement for weaving ribbon, tape, &c. Fig. 7 is a detail view showing the operation of the heddles and treadles. Fig. 8 is a detail view of the reed and shuttles. Fig. 9 is an enlarged detail view of shuttle cam and arm. Fig. 10 is a detail view showing the shuttle with the binder-thread passing through the weft-thread loop to make the selvage, and Fig. 11 is a detail view of lever and a cam provided with a groove in which a pin on the lever works and is guided to operate the lever. The knife D is preferably located where it appears in dotted lines in Fig. 1 and where it is shown in Fig. 5, but may be changed to any suitable location on the knife-frame. Fig. 12 is a plan view of the take-up mechanism for the cloth-rollers.

In the drawings, A A are the side frames of the loom. A and $A^2$ are cross-rails.

$A^3$ is a table for the cloth-rolls F.

$A^{33}$ represents side supports for the top table $A^4$, in which the spindles of the cloth-rolls F turn. The cloth-rolls F are secured to their spindles F' by a set-screw $F^2$.

$A^5$ is a rail for the carrier-bobbins $b$, which hold the filling, and $A^6$ is a cross-rail upon which are pins $h$, carrying the warp-rolls H.

Upon the main shaft 12 is a driving-pulley E, and power is communicated to the main shaft for the purpose of operating all the working parts of our loom.

The reed B, with horizontal dents $B^3$, which extends across the loom, as shown in Figs. 5, 6, and 8, is mounted on a guide-frame B', which is provided with a guide-pin $B^2$, around which is provided a spiral spring Y, the tension of which causes the reed to retire after it has beaten up the weft to the fell. The pins $B^2$ are secured to the cross-rail A' and pass through suitable holes in the end of the reed guide-frame, and the spiral springs Y are located on said springs between the cross-rail A' and the inner face of the end of the guide-frame, so that when the guide-frame B' is driven forward the pins B² pass through said holes in the end of the guide-frame, and the springs Y on said pins B² are compressed and cause the guide-frame, which carries the reed, to return after the reed has beaten the weft up to the fell, as above stated.

B²¹ is the cap of the guide-frame B', which forms a part of the cross-rail A'.

C is a weft-needle for carrying the filling Z through the warp X and forming a loop Z', through which the shuttle s passes, carrying the binder or selvage thread. The vertical rods $a$ connect the bottom frame $a'$ and the top frame $a^2$, the latter carrying the weft-needle C and the knife D. The said rods $a$ slide in the journals $a^3$, which are secured in the tables A³ and A⁴. The filling Z is taken from the bobbin $b$ over the guide-roller $e^3$ under a tension device, which consists of a bayonet-shaped piece of suitable material, the lower portion $e^2$ being adapted to press down on the filling when the upper portion $e$ is raised, the said bayonet-shaped tension device being pivotally mounted in the stand $e'$, which is secured to the upper table A⁴. Through said stand $e'$ the weft or filling passes to the eye of the needle C. The descent of the frames $a'$ and $a^2$ lowers the needle C, which carries the filling through the open shed of the warp X and below the warp, the needle passing down through the vertical slot L' in the arch L. At each point the shuttle s, which is pointed at both ends, having its flat face against the side of the arch L, is caused to pass through the loop Z', as shown in Figs. 8 and 10, and having passed through said loop the shuttle is caused to dwell, the frames $a'$ and $a^2$ rise, the needle C rising therewith, carrying the filling-thread upward, which engages the upper portion $e$ of the bayonet-shaped tension device, causing the lower portion $e^2$ to grip the filler at the rear portion of the tension device, thus enabling the needle in its upward movement to draw the filling tight in the warp-shed before the forming of a new shed. When the new shed is formed, the needle is lowered again through the new shed, forming a loop Z', as heretofore mentioned, and the shuttle is caused to return through the new loop with the binder-thread, when the needle is caused to rise again, and so the operation is repeated.

$h'$, $h^2$, and $h^3$ are respectively the drag-roller and weight for the control of the warp-rolls H.

X' represents the woven goods, X² eyes in the heddles X³, and X⁴ a cross in warp X.

The pulley E on the main driving-shaft 12 operates the cam $f$, depressing the free end of the lever $d^2$, which is held in tension to the cam by the spring S. The other end of the lever $d^2$ is connected by a connecting-rod $d'$ and pivot $d$ to the lower frame $a'$, which, as before stated, is connected by the vertical rods $a\ a$ to the upper frame $a^2$, to which is suitably secured the needles C and the knives D, as shown in Fig. 1. The rotation of the cam $f$ depresses the free end of the lever $d^2$, which is pivotally connected in the bracket $d^3$, raises the frames $a'$ and $a^2$, the needle C, and the knife D. The spring S, assisted by the weight of the frames $a'$ and $a^2$, brings the needle and the knife down. This construction is shown in Fig. 1. The form of cam $f$ shown in Fig. 11 is preferable to the form of cam as shown in Fig. 4 as a means for operating the lever $d^2$ to raise and lower the knife-frame $a^2$, as it is more positive. The pin $d^4$ on the lever $d^2$ works in the eccentric groove $f'$ in the cam $f$. Thus the lever is guided and controlled, regulating the ascent and descent of the upper and lower frames $a'$ and $a^2$.

The vertical rods $a\ a$ slide through suitable collars or guides $a^3$, located in the tables A³ and A⁴. The bobbins F, holding the finished product, are pivoted on spindles secured in the frames A³ and A⁴.

The take-up motion consists of the gears 4 and 5, operated by a lever and pawl 6 in the manner hereinafter described. To stop the motion of a bobbin, rendered necessary through accident or other emergency, the set-screw F² is slackened or loosened, permitting the spindle F' to turn in the bobbin without revolving the bobbin. The lever and pawl 6 may be attached to any part of the machine, preferably the end of the lever $k'$. Cords 60, 62, and 63 pass from the weight 67 over rollers 61, as shown in Fig. 12, connecting the outer end of lever 6 with the eye 64 of lever $k'$ on the shaft $k^{22}$. The cam $k$ on the main shaft 12 operates the lever $k'$, causing the lever 6, to which it is connected, and the pawl 66, which is pivotally secured to the said lever 6, to turn the ratchet-wheel 5. The spring 65 tends to press the pawl 66 into operative engagement with the ratchet-wheel. Secured to the ratchet-wheel 5 is a pinion 50, which meshes with and turns the gear 4 and its spindle F', to which the cloth-roller F is secured by the screw F². The shaft 12 by the gear-wheels 1, 2, and 3 gives motion to or operates the shaft 10, which by the gears 7 and 8 operates the shaft 13, upon which are keyed the cams M and $m$, which operate the treadles R²⁰ and R²¹.

R' represents collars between the treadles. R² represents counterbalance-rollers, and R³ represents counterbalance-weights.

T represents brackets for treadle-pivots.

Each treadle operates two heddles as follows: The two heddle-shafts $n$ are connected by the cord $r^{41}$, which passes around the guide-rollers R and R' at one end of each of said heddles, the other end of the one heddle being connected with the treadle and the similar end of the other heddle connected with the balance-weight R³ by the cord $r^{51}$, which passes over the guide-roller R². The cords M' and $m'$ are secured to the heddle-shafts $n$, and the extremity of the treadles R²⁰ and R²¹, respectively, passing over the guide-rollers $r^5$ which also act like the roller $r^4$ as guides and friction-rollers for the heddle-shafts $n$. The brackets of the heddle-cord rollers are indicated by the letter $r$. The bracket-rollers R' and R are provided with the respective grooves $r^2$ and $r^3$. The treadle-cam $m$ is used for weaving velvet, as are also the harness-pins $m'$ and the heddles. The harness-pins $n'$ are used when weaving ribbons.

The shaft 12 gives motion by the wheels 1, 2, and 3 to the shaft 10, at the extremity of which is located or secured the cam $N^2$, which revolves in a frame $N'$, forming part of the connecting-rod $N^{11}$. The frame $N'$ has a slot 15 formed in the back thereof to permit the lateral motion of the rod $N^{11}$. The extremity of the rod $N^{11}$ is pivoted to the rocking arm $N^{12}$, which is secured to the shaft $N^{13}$, upon which also is secured the levers or rocking arms N, pivoted in which and rocking on the pivots $N^7$ are cradles $N^6$, having prongs $N^4$ and $N^5$, holding loosely the shuttles $s$, said cradles being pressed against the shuttles by the springs $N^3$, which are secured to the lever N by the screw $N^8$. The springs $N^3$ also tend to keep the shuttles $s$ in close contact with the face of the arch-bar L. The rotation of the cam $N^2$ alternately reciprocates the rod or shaft $N^{11}$, giving a rocking motion to the lever $N^{12}$, and by the shaft $N^{13}$ the similar rocking motion to the arms or levers N, and by the cradles $N^6$ a rocking but semicircular motion to the shuttles $s$ $s$, carrying them through the loop Z' of the weft-thread Z at each backward-and-forward movement, which loop is formed by the upward-and-downward movement of the needle C. The shape of the cam $N^2$ is such that it permits the shuttles $s$ to dwell some little time at the end of each forward-and-backward motion. Time is thus given for the formation of the weft-loop through which the shuttle is to pass. The arch-bar L has formed on each side thereof channels or grooves L' to permit a free passage of the needle and filling between the shuttle $s$ and the arch-bar L. The friction-rollers $p$ $p$ are guides or help to support the ribbon between the needle and the take-up rollers F.

At the rear of the frames A A, supported by the cross-bar $A^6$, warp-beams H are pivoted upon the pins $h$, drag tension of which is given by the cords $h'$, passing over the guide-rollers $h^2$ and secured to the weights $h^3$. The warps X are crossed at $X^4$ by the lease-rods $t$ $t$ in the usual manner.

The reed B is operated as follows: The cam $k$ is secured to the shaft 12 and in its rotation operates the arm $k^{21}$, pivoted on the stud-shaft $k^{22}$, the vertical arm of which, $k'$, being pivoted to the connecting-rod $k^2$, the outer end of which is pivoted to the frame B', on which the reed is mounted, compresses spring Y, throwing the reed forward. The projecting lip $k^3$ on the cam $k$ gives accelerated motion to the reed at the end of its stroke or when it beats the weft up to the fell. The spring Y draws the reed back and keeps the arm $k^{21}$ always in contact with the face of the cam $k$.

Our loom will enable the operator to work from one line to sixty without any material change or alteration to the loom and without any additional expense. By simply adding or taking away heddles and by changing the throw of the lever which operates the weft-carrying needle-frame the loom can be regulated to weave goods from one-eighth ($\frac{1}{8}$) of an inch to six (6) inches wide.

In Fig. 7 the heddles are shown as they will be used in weaving a single-faced satin ribbon, each heddle having three eyes taking the place of three ordinary heddles in another loom. For double-faced satin we can use six eyes in one heddle, making each heddle do the work of six heddles.

By reference to Figs. 1, 8, and 10 of the drawings it will be seen that our loom is provided with bars running lengthwise thereof, which bars have an arched portion L, which is provided with a vertical groove L' to permit the free passage of a vertically-operating needle, which carries the filling down through said vertical groove, forming a loop, and that on each side of each arched bar is a similarly-formed groove, and that selvage-shuttles having a flat face and double-pointed ends are caused to pass with their flat faces against the sides of said arched bars, across said vertical grooves, and through the loops formed by said vertically-operating needles. The means for operating said selvage-shuttles is shown in the enlarged detail view of Fig. 8 of the drawings, in which cradles pivoted in rocking arms secured to a rocking shaft are suitably controlled by springs located on said rocking arms.

The cradles $N^6$, with their prongs $N^4$ and $N^5$, are supposed to be held only loosely and sufficiently in contact with the shuttles $s$ to enable the tension of the thread against the outside of the shuttle to support the shuttle from the claws of the cradles, forming a free passage for the thread between the shuttle and the claws. We propose to have the cradle pivoted at $N^7$ on the arms N of shaft $N^{13}$ merely for the purpose of passing the cradles outwardly when it is necessary to replace an empty bobbin by a full one. Consequently it is intended that the tension of the spring $N^3$ against the cradles $N^6$ is merely for the purpose of maintaining the cradles in such a position as to maintain the shuttle in its proper position without crowding it, and we propose to use means to prevent the cradles from crowding the shuttles more than is necessary to maintain the shuttle in a practical and operative position, which means may consist of a plate secured to the inner side of the arm N, the upper end of the plate serving as a stop to prevent the cradles $N^6$ from being pressed inwardly toward the shuttles any farther than is required, or said means may consist in making a notch on the lower and inner side of the cradle $N^6$ above its pivotal end and of a pin secured on the upper end of the lever N and adapted to engage said notch in the lower end of the cradle to prevent its passing inwardly farther than is required, or any suitable means for the purpose may be adopted.

The velvet is regarded to be simply a pattern on this machine, like any other pattern. By the introduction of the suitable harness the knife will cut it into velvet, and if there be no pile it is simply ribbon.

We claim—

1. In a loom for vertical weaving, the loom-frame, having bars running lengthwise of the loom, provided with an arched portion having a vertical groove to permit the free passage of the vertical needle and filling, in combination with double-pointed shuttles having a flat face, and adapted to traverse said arched portion of said bars, a rocking shaft, rocking arms secured thereto, cradles pivoted in said rocking arms, and adapted to hold said shuttles with their flat faces toward said arched bars, springs secured to said rocking arms, and adapted to restrict or limit the pivotal movement of said cradles and to maintain loosely, but in proper position, said shuttles, the main driving-shaft of the loom, and connections between said driving-shaft and said rocking shaft, to cause said shuttles to travel back and forth, describing an arc in passing the vertical slots in said arched bars, substantially as set forth.

2. The combination with the loom-frame and means thereon adapted to carry a number of sets of warp lengthwise of the loom on edge, one thread above the other in each set of warp, the sets of warp being parallel with, and in close proximity to, each other, of a series of heddles adapted to have a traverse motion, crosswise of the loom, to form and control simultaneously the sheds of the various sets of warp, means for thus operating said heddles, a reed movable lengthwise of the loom having dents arranged horizontally therein, one above the other, and adapted to receive the threads of the various sets of warp, and to beat the weft up to the fell the loom-shaft and operative connections between the reed and loom-shaft, a series of vertically-operated weft-needles adapted to carry the weft through the sheds so formed and to form loops of weft below them, a series of selvage-thread shuttles, means for thus operating said needles, and means for propelling said shuttles through the successive loops of weft, so formed below the warps, at each movement of the shuttles, substantially as set forth.

3. The combination with the loom-frame, and means thereon adapted to carry a number of sets of warp lengthwise of the loom one thread above the other in each set of warp, the sets of warp being parallel with each other, of a series of heddles adapted to have a traverse motion crosswise of the loom, means for thus operating said heddles, a reed or reeds movable lengthwise of the loom and means for operating the same, a series of vertically-arranged weft-needles adapted to carry the weft through the sheds so formed and to form loops of weft, and means to engage said loops, substantially as described.

In testimony whereof we affix our signatures in presence of two witnesses.

DRAKE F. CONKLIN.
THEOPHIL G. SINGER.

Witnesses:
JOHN F. KERR,
MINNIE McCONNON.